United States Patent
Sama

(10) Patent No.: US 7,913,014 B2
(45) Date of Patent: Mar. 22, 2011

(54) DATA PROCESSING SYSTEM AND METHOD FOR MEMORY ARBITRATION

(75) Inventor: Akshaye Sama, Northampton (GB)

(73) Assignee: NXP B.V., Eindhoven (NL)

(*) Notice: Subject to any disclaimer, the term of this patent is extended or adjusted under 35 U.S.C. 154(b) by 345 days.

(21) Appl. No.: 11/576,254

(22) PCT Filed: Sep. 19, 2005

(86) PCT No.: PCT/IB2005/053066
§ 371 (c)(1),
(2), (4) Date: Jan. 8, 2009

(87) PCT Pub. No.: WO2006/035344
PCT Pub. Date: Apr. 6, 2006

(65) Prior Publication Data
US 2009/0119433 A1 May 7, 2009

(30) Foreign Application Priority Data

Sep. 28, 2004 (EP) .................................. 04104709

(51) Int. Cl.
*G06F 12/00* (2006.01)
*G06F 13/36* (2006.01)
*G06F 13/28* (2006.01)

(52) U.S. Cl. ........ 710/117; 710/240; 710/244; 710/113; 710/119; 709/225; 711/150; 370/445

(58) Field of Classification Search .................. 710/117, 710/204, 240, 244
See application file for complete search history.

(56) References Cited

U.S. PATENT DOCUMENTS

| 4,969,120 | A | * | 11/1990 | Azevedo et al. ............... 710/117 |
| 5,948,089 | A | * | 9/1999 | Wingard et al. ............... 710/107 |
| 6,157,978 | A | | 12/2000 | Ng et al. |
| 6,396,499 | B1 | * | 5/2002 | Murayama .................... 345/443 |
| 6,415,367 | B1 | | 7/2002 | Baxter et al. |
| 6,701,399 | B1 | | 3/2004 | Brown |

FOREIGN PATENT DOCUMENTS

| EP | 0715261 A | 6/1996 |
| WO | 99/13405 A1 | 3/1999 |

* cited by examiner

*Primary Examiner* — Brian T Misiura

(57) ABSTRACT

The present invention relates to a data processing system is provided which comprises at least one first processing unit (CPU), at least one second processing unit (PU), at least one memory module (MEM), and an interconnect. The memory module (MEM) serves to store data from said at least one first and second processing unit (CPU, PU). The interconnecting means couples the memory module (MEM) to the first and second processing units (CPU, PU). In addition, an arbitration unit (AU) is provided for performing the arbitration to the memory module (MEM) of the first and second processing units (CPU, PU). The arbitration is performed on a time window basis. A first access time during which the second processing unit (PU) has accessed the memory module and a second access time which is still required by the second processing unit (PU) to complete its processing are monitored during a predefined time window by the arbitration unit (AU). The second access time is compared to the remaining access time in the time window and if the remaining access time is larger than the second access time, the arbitration unit (AU) allows said at least one first processing unit (CPU) to access the memory module in said time window. Otherwise, the arbitration unit (AU) restricts the access of the at least one first processing units (CPU) and allows the at least one second processing unit (PU) to access the memory module (MEM).

4 Claims, 2 Drawing Sheets

DATA PROCESSING SYSTEM AND METHOD FOR MEMORY ARBITRATION

BACKGROUND OF THE INVENTION

The present invention relates to a data processing system, a memory controller as well as a method of memory arbitration.

For data processing systems which comprise a plurality of data processing units like a central processing unit CPU and several dedicated processing units PU, the communication is usually performed via a bus or an interconnect network and data is stored in a central memory. The central processing unit CPU may implement programmable processing functions. As in such a data processing system multiple processing units share memory resources, an arbitration of the shared resources must be implemented in order to determine which data processing unit is granted access to the shared memory. Such an arbitration schedules the requests for access to the shared resources to assure that the memory only needs to handle a single request at one time and to assure that requests from data processing units with high priority are handled more often than requests from other data processing units. Accordingly, the available memory bus capacity is divided into a bandwidth limit for each data processing unit. If the arbitration is not performed properly some data processing units may have to wait for a long time to access the bus. On the other hand data processing units having to implement a real time processing may not be able to perform their requested real time processing such that a severe degradation or even failure in the performance of the systems is resulted. Standard methods for arbitration include TDMA, fixed priority accesses, round-robin and the like. Combinations of these standard arbitration schemes are also used.

Due to the increased integration of several programmable or dedicated processing units PU on a single chip, i.e. a system-on-chip SoC, on-chip traffic with different kinds of traffic constraints may be present. Such traffic constraints may include hard real time HRT, soft real time SRT, best effort BE, latency critical LC or the like. As the amount of memory that is implemented on a system-on-chip is a significant factor regarding the overall costs, usually a shared memory is provided. Such memory may also be an external memory like a SDRAM memory. Therefore, a dedicated processing unit implementing real time processing must share the interconnect and the shared memory with a programmable processing unit implementing latency critical processing. The challenge in such a system is to distribute the memory bandwidth over the agents for the data processing units performing hard-real time processings and the agents of data processing units performing latency critical processing. The arbitration must be performed such that a low latency access is provided for the agents requesting low latency while the guarantees necessary for real time processing are met.

One way to ensure these guarantees is to provide fixed windows for hard-real time traffic during which other low latency traffic is blocked and the agents associated to the hard real time processing's are given a higher priority. Although this may ensure that the hard-real time guarantees are maintained, it will produce significant latency for the low latency traffic during the fixed window for the hard-real time processing.

A further method to solve the requirements is to limit the bandwidth that may be used by low latency traffic such that latency critical traffic is blocked as soon as it uses the bandwidth excessively. However, such arbitration scheme may cause violations of the hard-real time requirements as the efficiency of the access to the memory may be different for various traffic types. In addition, such arbitration scheme requires an extensive fine-tuning.

SUMMARY OF THE INVENTION

It is therefore an object of the invention to provide a data processing system, a memory controller as well as a method for memory arbitration which are capable of providing a low latency access for latency critical processing while still ensuring that real time guarantees are maintained.

This object is solved by a data processing system according to claim 1, by a memory controller according to claim 4 as well as by a method for memory arbitration according to claim 5.

Therefore, a data processing system is provided which comprises at least one first processing unit, at least one second processing unit, at least one memory module, and an interconnect. The memory module serves to store data from said at least one first and second processing unit. The interconnecting means couples the memory module to the first and second processing units. In addition, an arbitration unit is provided for performing the arbitration to the memory module of the first and second processing units. The arbitration is performed on a time window basis. A first access time during which the second processing unit has accessed the memory module and a second access time which is still required by the second processing unit to complete its processing are monitored during a predefined time window by the arbitration unit. The monitored second access time is compared to the remaining access time in the time window and if the remaining access time is larger than the second access time, the arbitration unit allows said at least one first processing unit to access the memory module in said time window. Otherwise, the arbitration unit restricts the access of the at least one first processing units and allows the at least one second processing unit to access the memory module.

Accordingly, it is assured that a minimum bandwidth is maintained for the processing of the second processing unit while the processing from the first processing unit is given a higher access priority as long as there is sufficient bandwidth and access time for the processing of the second processing unit.

According to an aspect of the invention the first processing unit performs a latency critical processing and the second processing unit performs a real time processing. Therefore, the requirements for real time processing are met by associating a minimum bandwidth for these processing while the latency critical processing are given a low latency access as long as they do not request excessive access to the memory.

According to a further aspect of the invention, the second access time can be predefined or determined during run time based on the traffic characteristics of the processing unit. If the processing unit is "close" to violating its requirement, the interconnect must ensure that the access requests from the particular PU are visible to the arbitration unit. It is therefore possible to perform a fine-tuning of the different requirements of the latency critical and the real time processing.

The invention also relates to a memory controller for controlling the access to an external memory. The memory controller receives access requests for the external memory from at least one first and at least one second processing units. The memory controller comprises an arbitration unit for performing the memory arbitration of the first and second processing units. The arbitration is performed on a time window basis. A first access time during which the processing unit has accessed the memory module MEM and a second access time which is required by the second processing unit to complete its processing are monitored during a predefined time window by the arbitration unit. The second access time is compared to the remaining access time in the time window and if the remaining access time is larger than the second access time, the arbitration unit allows said at least one first processing unit to access the memory module in said time window. Otherwise, the arbitration unit restricts the access of the at least one first processing units and allows the at least one second processing unit to access the memory module.

The invention further relates to a method for performing arbitration to the access to a memory module from at least one first and at least one second processing unit. Access requests are received for the external memory from at least one first and at least one second processing unit. The memory arbitration of the first and second processing units is performed. The arbitration is performed on a time window basis. A first access time during which the second processing unit has accessed the memory module and a second access time which is required by the second processing unit to complete its processing are monitored during a predefined time window by the arbitration unit. The second access time is compared to the remaining access time in the time window and if the remaining access time is larger than the second access time, said at least one first processing unit is allowed to access the memory module in said time window. Otherwise, the access of the at least one first processing units is restricted and the at least one second processing unit is allowed to access the memory module.

These and other aspects of the invention are apparent from and will be elucidated with reference to the embodiment(s) described herein after.

DETAILED DESCRIPTION OF THE INVENTION

Figure 1:
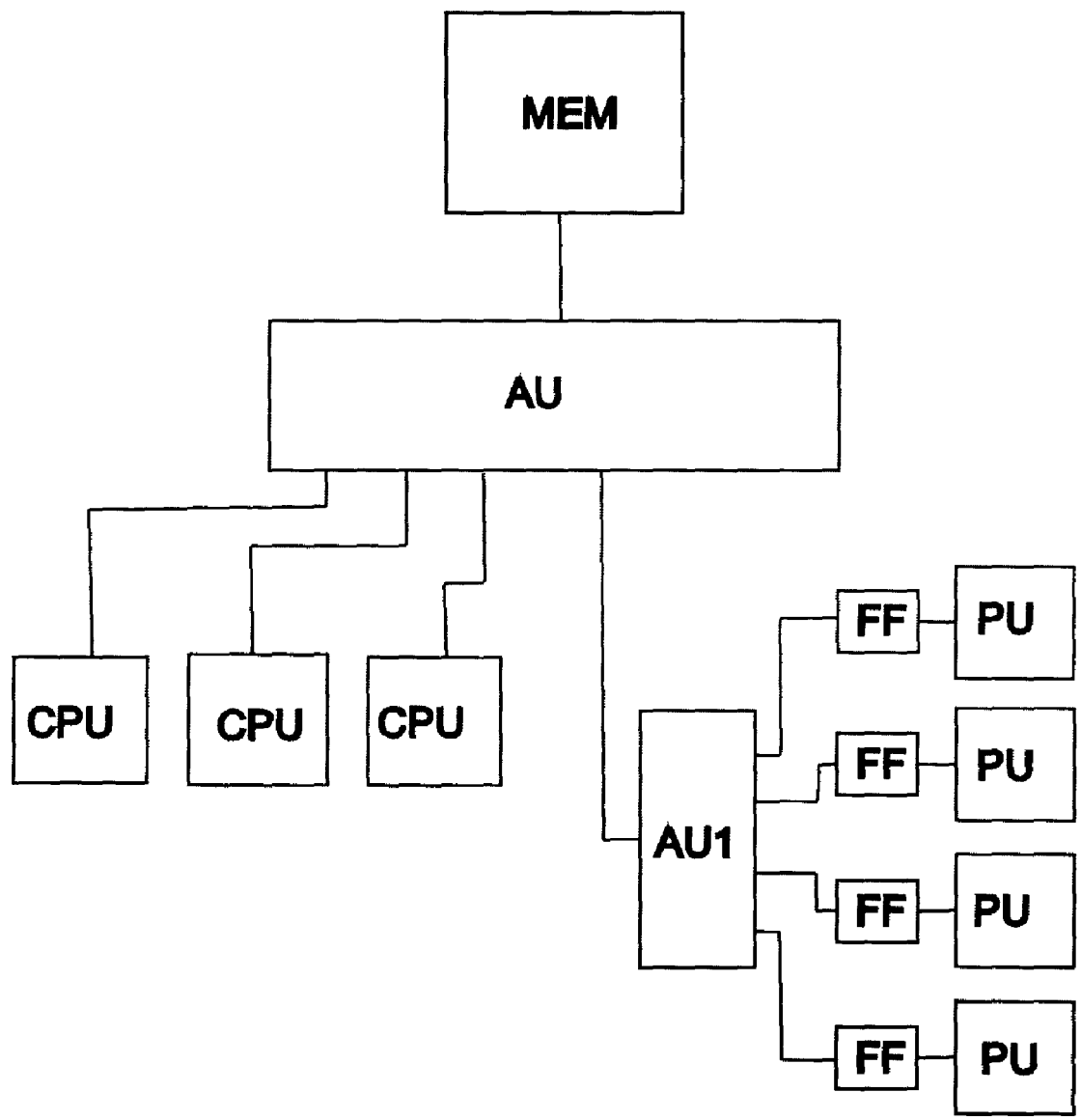
FIG. 1 shows a basic arrangement of a system on chip according to the invention.

In FIG. 1 a basic arrangement of a system on chip according to the invention is shown. Such a system on chip comprises a shared memory MEM, several programmable processing units CPU, several processing units PU for dedicated processings and an arbitration unit AU for performing the memory arbitration for the programmable and dedicated processing units CPU, PU. The processing unit PU are connected to a level 1 arbitration unit AU1 via respective FIFOs FF. The level 1 arbitration unit AU1 is in turn coupled to the arbitration unit AU. Alternatively, the processing units PU may also be connected to the arbitration unit AU.

The arbitration unit AU provides time windows during which the processing from one of the dedicated processing units PU may be performed based on hard-real time processing. Such time window may be half of the hard-real time guaranteed bandwidth. However, in order to meet the required hard-real time guarantees a programmable number of hard-real time data transfers from the dedicated processing units PU have to take place within such a window. During each cycle within the time window the arbiter unit AU monitors the amount of data transfers from the agent, i.e. HRT agent, from the dedicated processing units PU performing the hard-real time processing. Based on a memory interface efficiency estimation for this particular traffic type, the arbiter unit AU calculates how many cycles are still required for the HRT agent to perform its remaining transfers. The arbiter unit AU then compares this calculated time with the time remaining in the current time window. If the remaining time is less or close to the calculated estimation, the HRT agent is given the highest priority to accessing the bus and the memory module MEM.

In operation, the arbiter unit AU first gives a high priority to latency critical traffic from programmable processing units CPU in order to provide a low latency access. The arbiter unit AU tries to place the HRT traffic in any empty time slots during which the latency critical traffic is not present, e.g. due to sporadic processor cache misses. During the process of a time window the arbiter switches the priority to the HRT traffic if the latency critical traffic requests excessive access to the memory module MEM such that the arbiter unit AU detects that a programmed real-time requirement is close from being violated. Accordingly, the arbiter unit AU according to the invention is designed to provide the HRT bandwidth guarantee and only produces a latency hit when an actual threat of violating the real-time requirements is present.

The arbitration of hard-real time traffic does not impose a great problem, as this type of traffic is a very defined traffic type such that an accurate estimation of the actual traffic may prevent excessive switching between agents, which may cause efficiency deterioration.

In the following, a memory controller according to a second embodiment of the invention is described. The memory controller comprises several direct memory access DMA ports to which dedicated processing units PU may be connected to. The memory controller may further be connected to an external memory module MEM and is designed for controlling the access of the programmable and dedicated processing units CPU and PU to the memory module. Within the memory controller several programmable values are present to convey the particular processing requirements to the arbitration unit, namely, the number of data elements to be transferred on a port, the number of cycles during which this data transfer has to be performed, and a worse case efficiency estimate for the port transfers. These programming values are preferably present for those ports on which processing units PUs with HRT constraints are present.

In order to perform the memory arbitration according to the second embodiment three registers are implemented in the memory controller. The first register DMA_AR constitutes a programmed register for the number of accesses required by a DMA port, i.e. by one of the programmable or dedicated processing units CPU, PU. The second register DMA_QL is a programmed register as well for the number of cycles in a time window during which the first register DMA_AR transfers have to be performed. The third register DMA_EE is a programmed register as well for the estimate on the DMA transfer efficiency, i.e. memory bus efficiency for traffic from the PU with HRT constraints. The value thereof may be selected as 0.5, i.e. 50 per cent efficiency.

In addition, the memory controller comprises two internal counters. The first counter DMA_AC is used for counting the number of DMA transfers within a quantum or time window. This counter is increased by the burst size after each DMA command or each command or transfer from the processing unit PU. The second counter DMA_QC is used for counting the number of cycles performed currently in the quantum, i.e. the time window. This counter is increased by one for each cycle with the value as stored in the second register DMA_QL being the limit in the quantum.

Therefore, if the value of the first register DMA_AR minus the value in the first counter DMA_AC is larger than the value of the second register DMA_QL minus the value of the second counter DMA_QC times the value of the third register DMA_EE, i.e. DMA_AR−DMA_AC>=(DMA_QL−DMA_QC)*DMA_EE, then the guarantees for the DMA bandwidth may not be maintained and there is no space to accommodate requests from the programmable processing unit CPU. In other words if the number of transfers which are still required to be performed in this quantum is bigger or equal to the estimate of the amount of additional transfers can be performed within the quantum, the processing from the DMA port is assigned the highest priority. If this condition is false, the arbiter unit AU has determined that the DMA bandwidth guarantee can be maintained and the bandwidth for the CPU traffic can be allocated, i.e. the traffic from the CPU have a higher priority. Preferably, this is checked for every arbitration cycle Additionally, a threshold can be used to add a margin to this calculation, so that, DMA_AR−DMA_AC+DELTA>=(DMA_QL−DMA_QC)*DMA_EE Alternatively and preferably, the number of transfers still left to do in the window is counted instead of the transfers already done in a window. Therefore, instead of counting up from 0, the first counter DMA_AC would be initialized to DMA_AR and will be decremented by the number of accesses done, until it reaches 0. In other words, the number of cycles left in the quantum is counted, instead of the cycles already done in the quantum. Furthermore, the second counter DMA_QC will be initialized to DMA_QL at the beginning of the time window and will be decreased by 1 every cycle till it reaches 0. Due to the change from incrementing to decrementing, the "minus" in the above equation is no longer required. The value of DMA_AC can be directly used for this calculation. Therefore, if the value of the first register DMA_AC is larger than the value of the second counter DMA_QC times the value of the third register DMA_EE, i.e. DMA_AC>=(DMA_QC)*DMA_EE than the guarantees for the DMA bandwidth may not be maintained and there is no space to accommodate requests from the programmable processing unit CPU. Additionally, a threshold can be used to add a margin to this calculation. so that, DMA_AC+DELTA>=(DMA_QC)*DMA_EE Accordingly, for each time window the arbiter unit AU will grant the traffic from the CPU access to the memory module MEM initially to enable low latency traffic. The traffic from the DMA ports are shifted whenever the CPU ports are idle and do not issue a request.

However, if the load on the traffic from the CPU is relatively small, then such a process can maintain the DMA bandwidth requirement. On the other hand, if the traffic from the CPU requests excessive access to the memory that the DMA bandwidth requirements are in danger to be violated, the arbiter unit AU blocks the access requests from the CPU traffic until the DMA bandwidth requirements can be maintained again.

The programming of the registers is very simple and can be determined based on the processing requirements. The processing traffic from the CPU will be granted a lower latency access as long as the CPU traffic does not request excessive access to the memory module MEM such that the guarantees for the DMA bandwidth is not in danger. As the above mentioned arbitration technique is based on absolute values for the bandwidth in terms of data transfer and cycles, the accuracy can be improved as compared to known arbitration schemes. In addition, a specific guarantee regarding the bandwidth, i.e. a net bandwidth (based on actual number of transfers), can be provided per quantum. The arbitration technique according to the invention is more tolerant to changes in the efficiency of the memory communication which may be double data rate DDR. If the efficiency of the DDR communication is changed, this will also result in a different minimum bandwidth requirement for the DMA traffic. In other words, even if the efficiency of the DDR interface changes due to traffic from agents, as long as the Efficiency estimate (programmed as DMA_EE) for the particular HRT agent remains the same, the HRT requirement is sure to be met.

Figure 2:
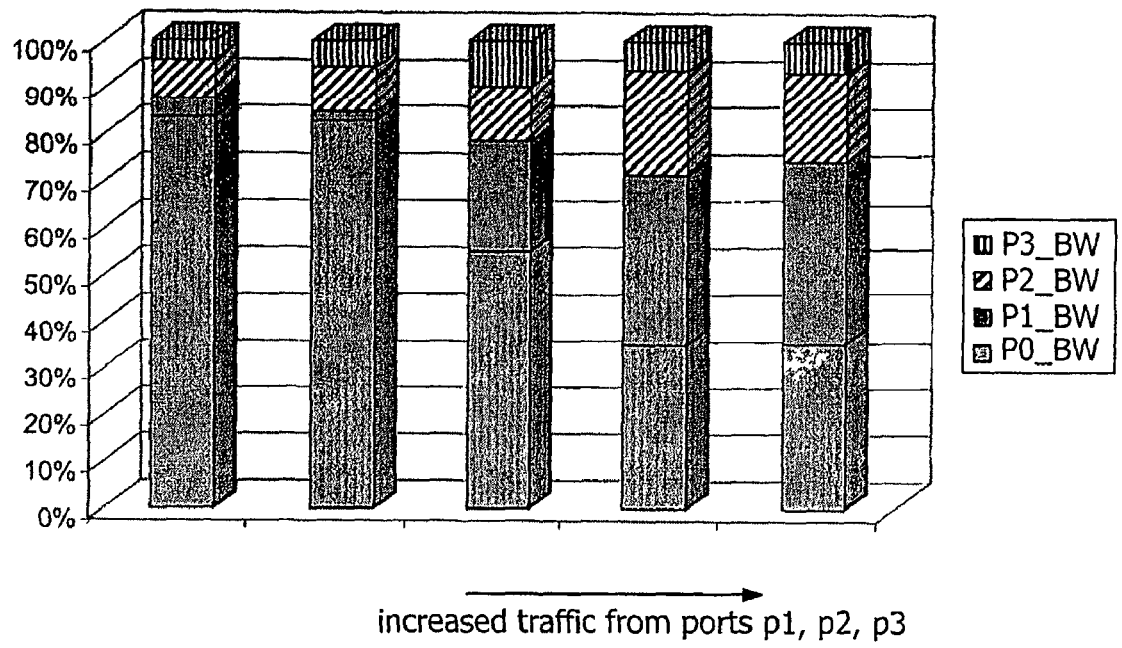
FIG. 2 shows a graph illustrating the use of the bandwidth for several processing units of FIG. 1.

FIG. 2 shows a graph illustrating the traffic from different processing units from FIG. 1. Here, P0_BW relates to the bandwidth as consumed by the port zero of the memory controller. The port zero constitutes the DMA port of the memory controller that is provided for all real time processing, in particular after a first level arbitration. The port may contain both Soft real time (SRT) and Hard real time (HRT) traffic. The first level arbitration ensures that the HRT traffic is given higher priority so that when HRT traffic is present, then the SRT traffic is delayed. P1_BW, P2_BW, P3_BW relate to the bandwidth as consumed by the ports 1, 2 and 3, respectively. These three ports are used for the programmable processing units CPU. The CPU ports do not have HRT constraints on their traffic, but have a low latency requirement.

FIG. 2 represents some results when the above scheme presented here is coded into a simulation environment and executed. The X-axis represents different traffic conditions applied on the memory controller. The leftmost case has low traffic on the CPU ports (p1, p2, p3). As we move to the cases on the right, the traffic from the CPU ports in increased gradually. The Y-axis represents a percentage of the memory bus bandwidth that is used by the respective ports. In the leftmost case, because the traffic from the CPUs is low, most of the bandwidth is used by the port 0 (DMA port with HRT constraints also). As the CPU traffic is increased, from left to right, the bandwidth consumption of the CPU increases and consequently the bandwidth consumption of the DMA port p0 decreases. Under these conditions (case 1, 2, 3 from left) the CPU accesses are offered low latency. This behaviour is seen consistently if the CPU traffic does not threaten DMA HRT constraints.

The 2 rightmost cases (case 4, 5) show the case when the bandwidth guarantee scheme described above provides protection to the DMA HRT deadline. In these cases, the CPU bandwidth requests have increased so much that the DMA HRT guarantee is threatened and thus the CPU requests are blocked. The results show that if the CPU bandwidth requests keep on increasing, the system still ensures that the HRT agents receive adequate bandwidth according to the values programmed in the controller.

Figure 3:
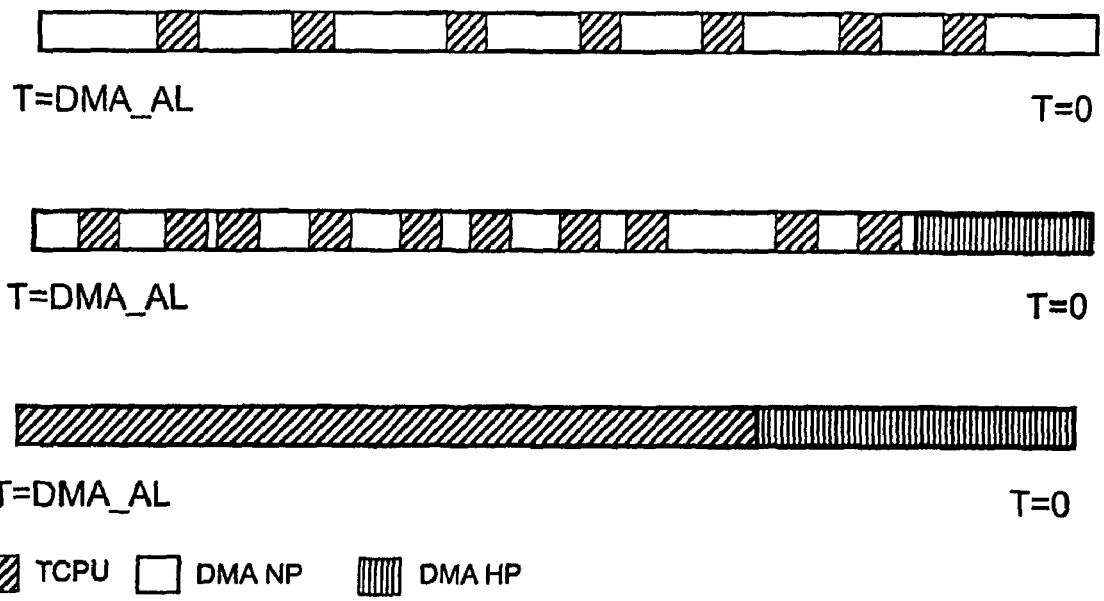
FIG. 3 shows an illustration of accesses to a shared memory in a system according to FIG. 1.

FIG. 3 shows an illustration of accesses to a shared memory in a system according to FIG. 1. Here, three examples of memory accesses are shown. The upper example shows a low traffic TCPU from the CPU, which can be served with low latency. The accesses TCPU from the CPU are evenly distributed such that the traffic from the DMA ports with normal priority DMA_NP can also be evenly distributed. The example in the middle shows a situation with higher CPU traffic TCPU that is serviced with low latency. However, the CPU traffic TCPU is only serviced until the HRT deadline is threatened. Then DMA high priority traffic DMA_HP is serviced. The lower example shows a situation with very high CPU traffic TCPU. This traffic TCPU is serviced with low latency until the HRT deadline threatened. Then the CPU traffic TCPU is blocked and the DMA high priority traffic DMA_HP is serviced.

The above mentioned arbitration technique may be applied in system on chips for audio-video applications, which may comprises dedicated processing units PU for performing a real time processing and which may comprise applications running on the programmable processing units CPU. Alternatively, the arbitration scheme may also be implemented in mobile solutions. The above scheme is used in real time processing (audio-video and the like) with shared resources with non real time latency critical processing.

Hard real time traffic HRT relates to the bandwidth requirement of a DMA agent, i.e. a DMA processing, which is to be performed within a relatively short period of time. A violation of this bandwidth requirement may result in a functionality area. Example of such a traffic is the input and output of audio and video.

Soft real time traffic relates to the bandwidth requirements of a DMA agent that are to be fulfilled within a relatively long period of time as compared to the hard real time traffic. Examples of this agents may be memory based video coprocessors.

The deadline for hard real time traffic must be maintained in every time slot as severe consequences may be present if one time slot is missed. The deadline for the soft real time traffic is distributed over a period of multiple time slots. Accordingly, if the soft real time traffic does not get sufficient bandwidth within one time slot, it will be possible to acquire bandwidth within later time slots such that the overall system will still be working.

The invention is based on the concept to provide a minimum bandwidth requirement for the traffic from dedicated processing units PU such that the traffic from this processing units PU are not discriminated. Without the provision of an efficiency based prediction of the bandwidth requirement for the traffic from the dedicated processing units PU and implementation of such a minimum requirement may result in an increased latency for the latency critical traffic from the CPU. If the arbiter unit AU has no information how long the HRT traffic from the dedicated processing units PU can be delayed, the HRT traffic will be associated to the beginning of a time slot or a time window in order to ensure that no real time deadline is violated. However, if a latency critical traffic from a CPU request an access to the memory module MEM during an initial part of the time slot it may be blocked as the HRT traffic is given a higher priority.

The above mentioned arbitration scheme may be implemented in a memory controller with an SDRAM interface. In such a memory controller the efficiency values of the interface may very between 30 percent and 90 percent depending on the actual traffic type. As the dedicated processing units PU usually have a defined traffic type, the efficiency values for such a traffic type may be used in order to predict the real time deadline and whether this deadline can be maintained. Based on these values the arbiter unit will monitor which of the real time traffic requests from the dedicate processing units PU may be delayed before the real time deadline of this traffic is threatened.

In other words, the arbitration scheme according to the above embodiments defines a minimum bandwidth limit on the traffic from the dedicated processing units PU rather than defining a maximum bandwidth limit on the latency critical traffic from the CPU. This is in particular advantageous as the traffic from the programmable processing units CPU is less predictable than the traffic from the dedicated processing units PU. The traffic from the CPU is only blocked in those cases that the provision of the real time requirements may be violated. Based on the efficiency calculations the arbiter unit AU can determine when such a violation is possible.

If a dedicated processing unit PU e.g. requires 10 data items in hundred cycles than the following case may occur:
cycle 1 to 10 relate to a data transfer of a processing unit,
cycle 11 to 190 relate to other data transfer,
cycle 191 to 290 relate to data transfer from processing units.

Here, 10 data items are transferred for the dedicated processing unit PU in the first hundred cycles and the following ten data items are transferred during the next hundred cycles. However, with this scheme, the real time requirements are not maintained as for example during the cycles 50 to 150 no data item has been transferred from the dedicated processing unit in this period of 100 cycles, i.e. the requirement is violated.

However, if 5 data elements are transferred in every 50 cycles, i.e. half of the actual requirements, then
cycle 1 to 5 data transfer from the processing unit,
cycle 6 to 95 other data transfer, and
cycle 96 to 100 data transfer from processing unit and so on.

Accordingly, in every 100 cycles 10 data items will be transferred irrespective which 100 cycles are chosen.

The efficiency of the DMA transfer relates to the efficiency of the SDRAM interface if DMA transaction are offered to the memory controller. Each of the dedicated processing units PU will comprise its own traffic type.

The DRAM interface is not able to transfer one data item per cycle and due to the processing overheads the actual number of data transfer during a cycle is less. Such overheads may be SDRAM refreshes, activate signals, pre-charge commands or the like. The actual percentage of the respective data transfer cycles is referred to as efficiency. Such efficiency of the interface will greatly depend on the traffic that is processed by the memory controller. A 128 byte lined linear transfer traffic will have a much higher efficiency than a 4 byte unaligned randomly addressed traffic as the controller will need an overhead for closing and opening rows frequently in such a case.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. A data processing system comprising:
at least one first processing unit configured to perform latency critical processing;
at least one second processing unit configured to perform real time processing;
at least one memory module for storing data from said at least one first and second processing unit;
an interconnect means for coupling said memory module to the first and second processing units; and
an arbitration unit for arbitrating for access to the memory module for the first and second processing units on a time window basis by monitoring a first access time during which the second processing unit has accessed the memory module and a second access time which is required by the second processing unit to complete its processing during a predefined time window, and by comparing the second access time to the remaining access time in the time window, wherein said arbitration unit is configured to allow said at least one first processing unit to access the memory module in said time window if the remaining access time is larger than the second access time, and allows the at least one second processing unit to access the memory module if the remaining access time is not larger than the second access time, wherein said arbitration unit is configured to first give a high priority to latency critical traffic from said at least one first processing unit in order to provide a low latency access, and to place traffic of the at least one second processing unit in any empty time slots during which the latency critical traffic is not present, and wherein during the process of a time window the arbitration unit is configured to switch a priority to the traffic of the at least one second processing unit if the latency critical traffic requests access to the at least one memory module such that the arbitration unit detects that a programmed real-time requirement is close to being violated, so as to provide a bandwidth guarantee for the traffic of the at least one second processing unity and to only provide a latency hit when an actual threat of violating the real-time requirements is present.

2. A data processing system according to claim 1, wherein the second access time can be determined during run time based on traffic characteristics of the at least second processing unit.

3. A memory controller for controlling the access to an external memory, wherein the memory controller receives access requests for said external memory from at least one first and at least one second processing unit, the at least one first processing unit being configured to perform latency critical processing, and the at least one second processing unit being configured to perform real time processing, comprising:

an arbitration unit for arbitrating access to the memory module for the first and second processing units on a time window basis by monitoring a first access time during which the second processing unit has accessed the memory module and a second access time which is required by the second processing unit to complete its processing during a predefined time window, and by comparing the second access time to the remaining access time in the time window, wherein said arbitration unit is configured to allow said at least one first processing unit to access the memory module in said time window, if the remaining access time is larger than the second access time, and allows the at least one second processing unit to access the memory module if the remaining access time is not larger than the second access time, wherein said arbitration unit is configured to first give a high priority to latency critical traffic from said at least one first processing unit in order to provide a low latency access, and to place traffic of the at least one second processing unit in any empty time slots during which the latency critical traffic is not present, and wherein during the process of a time window the arbitration unit is configured to switch a priority to the traffic of the at least one second processing unit if the latency critical traffic requests access to the at least one memory module such that the arbitration unit detects that a programmed real-time requirement is close to being violated, so as to provide a bandwidth guarantee for the traffic of the at least one second processing unity and to only provide a latency hit when an actual threat of violating the real-time requirements is present.

4. A method for arbitrating for access to a memory module for at least one first and at least one second processing unit on a time window basis, the at least one first processing unit being configured to perform latency critical processing, and the at least one second processing unit being configured to perform real time processing, comprising the steps of:

monitoring a first access time during which the second processing unit has accessed the memory module, monitoring a second access time which is required by the second processing unit to complete its processing during a predefined time window, and comparing the second access time to the remaining access time in the time window during a predefined time window, wherein said at least one first processing unit is allowed to access the memory module in said time window if the remaining access time is larger than the second access time, and the at least one second processing unit is allowed to access the memory module if the remaining access time is not larger than the second access time, wherein said arbitration unit is configured to first give a high priority to latency critical traffic from said at least one first processing unit in order to provide a low latency access, and to place traffic of the at least one second processing unit in any empty time slots during which the latency critical traffic is not present, and wherein during the process of a time window the arbitration unit is configured to switch a priority to the traffic of the at least one second processing unit if the latency critical traffic requests access to the at least one memory module such that the arbitration unit detects that a programmed real-time requirement is close to being violated, so as to provide a bandwidth guarantee for the traffic of the at least one second processing unity and to only provide a latency hit when an actual threat of violating the real-time requirements is present.

* * * * *